Jan. 30, 1962  E. H. WITTENBERG ET AL  3,018,970
FLUID-OPERATED LIQUID SPRAYERS

Filed Nov. 18, 1959  2 Sheets-Sheet 1

INVENTORS
EDWARD H. WITTENBERG
BY JERRY H. CHOPA

Moore, White & Burd
ATTORNEYS

Jan. 30, 1962    E. H. WITTENBERG ET AL    3,018,970
FLUID-OPERATED LIQUID SPRAYERS

Filed Nov. 18, 1959    2 Sheets-Sheet 2

INVENTORS
EDWARD H. WITTENBERG
BY JERRY H. CHOPA

Moore, White & Burd
ATTORNEYS

United States Patent Office
3,018,970
Patented Jan. 30, 1962

3,018,970
FLUID-OPERATED LIQUID SPRAYERS
Edward H. Wittenberg and Jerome H. Chopa, both of P.O. Box 38, La Crosse, Wis.
Filed Nov. 18, 1959, Ser. No. 853,890
2 Claims. (Cl. 239—323)

This invention relates to new and useful improvements in liquid sprayers and more particularly to sprayers which are actuated by water pressure.

It is well known that many different varieties of garden spray chemicals, such as growth acceleration, fertilizers, and particularly insecticides and fungicides, have heretofore been applied to plants by hand-operated sprayers utilizing a piston device which must be manually reciprocated to eject or dispense chemicals from the sprayer. Such sprayers, when filled, may become rather cumbersome and fatiguing to manipulate and, hence, have not proven entirely satisfactory. Power-operated sprayers utilizing a compressor and pressure pump have also been utilized, but these are expensive and are used largely by truck gardeners, nurseries, etc., as may well be understood.

An important object of the present invention is to provide a simple, inexpensive liquid sprayer which readily lends itself for a wide range of uses, from the small garden variety of sprayer to the relatively large sprayers such as many being used by nurseries, etc., its only requisite being a suitable supply of water under pressure.

A further object of the invention is to provide a sprayer of the class described comprising a tank having a flexible diaphragm therein dividing the interior of the tank into two non-communicating chambers, one providing a reservoir for a liquid to be sprayed and the other a pressure chamber for receiving a pressure fluid such as water under pressure, such pressure fluid actuating the diaphragm to place the chemical or insecticide in the reservoir under pressure whereby, when a spray gun or nozzle in communication with the reservoir is actuated by an operator, chemical may readily be sprayed onto plants, etc. with a minimum of labor and effort.

Other objects of the invention will become apparent from the drawings and the following detailed description in which like reference numerals refer to like parts and which it is our intention to illustrate the applicability of the invention and in which.

Figure 5:
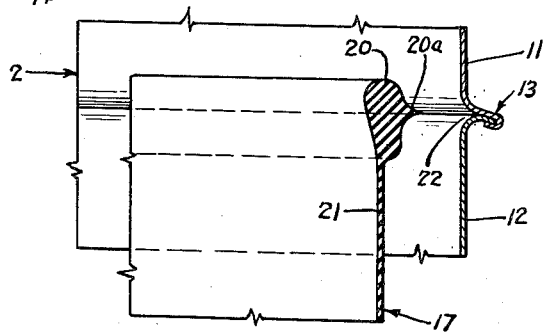
Figure 2:
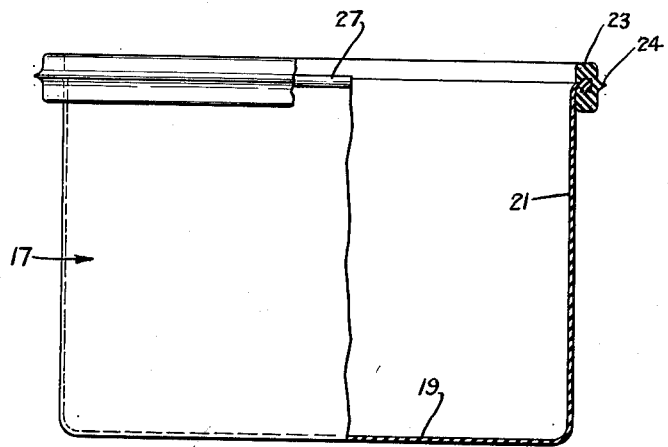
FIGURE 2 is a side elevation of the diaphragm removed from the sprayer, partially broken away to more clearly illustrate the construction thereof.
Figure 3:
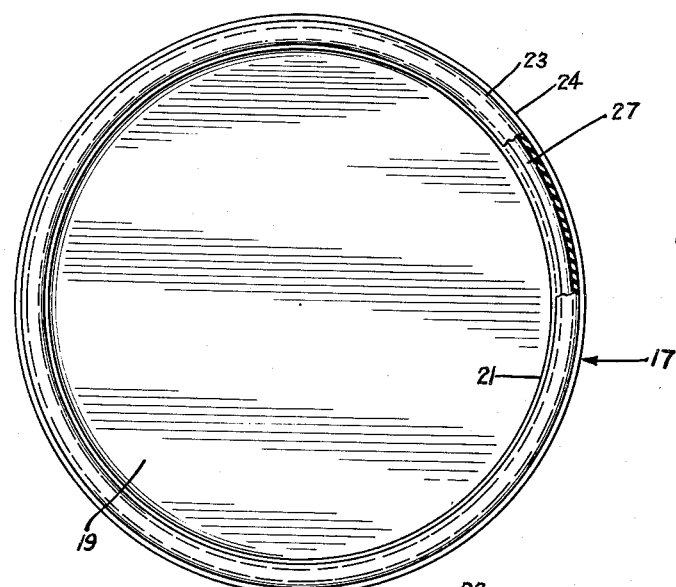
FIGURE 3 is a top view of FIGURE 2, partially broken away.
Figure 4:
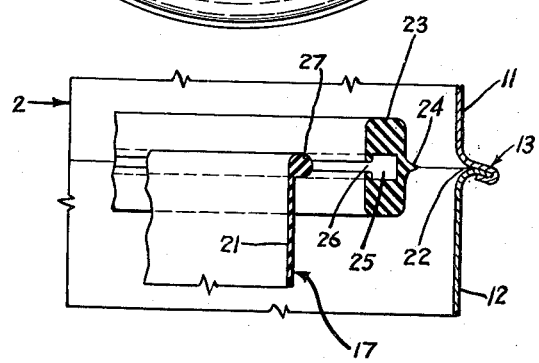

FIGURE 4 is an enlarged fragmentary view showing a portion of the tank wall with its inwardly-facing annular groove, the retaining ring has a flange element which is adapted to be fitted into said groove, and also showing the annular groove in the retaining ring for receiving the bead provided at the upper end of the diaphragm; and FIGURE 5 is a view similar to FIGURE 4 but showing a slightly modified construction wherein an enlarged annular bead is provided at the upper end of the diaphragm having an outwardly extending or radial flange receivable in the annular inwardly-facing groove in the tank wall, thereby to secure the diaphragm in position in the tank and to seal the connection between the diaphragm and the tank wall.

The novel sprayer herein disclosed is shown comprising a tank, generally designated by the numeral 2, having a bottom wall 3 and a top wall 4, shown provided with an opening 5 normally closed by a suitable cover 6. Suitable means indicated at 7 is provided for locking the cover to the tank wall 4 in a manner to compress the annular sealing ring 8 to render the closure leaktight. A suitable carrying handle 9 is secured to the cover 6.

Figure 1:
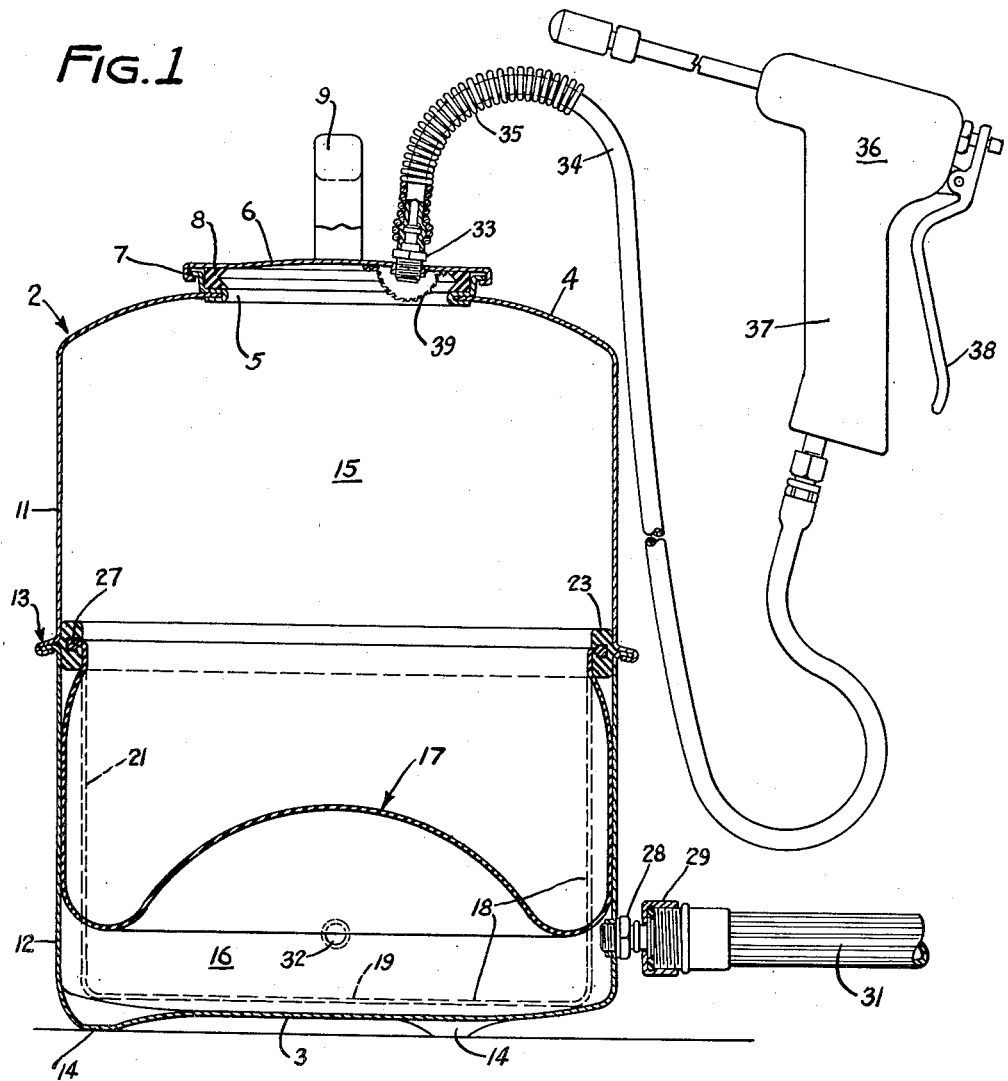
FIGURE 1 is a vertical sectional elevation of the sprayer showing a spray nozzle or gun attached to the upper end of the tank and a pressure fluid conduit to the lower portion of the tank below the diaphragm.

The tank is shown comprising two sections 11 and 12 having their marginal edges crimped together, as shown at 13 in FIGURE 1, to provide in effect an integral tank structure. The bottom wall 3 is preferably formed with downward protrusions 14 which serve as feet for the tank to rest upon.

An important feature of the present invention resides in the means provided within the tank for dividing it into two non-communicating chambers 15 and 16, chamber 15 serving as a reservoir for a suitable liquid to be sprayed, and chamber 16 serving as a pressure chamber, as will subsequently be described.

To thus divide the interior of the tank into two separate chambers a flexible diaphragm, generally designated by the numeral 17, is removably supported within the tank. The diaphragm, when in its normal relaxed state, is generally cup-shape in configuration, as indicated by the dotted lines 18 in FIGURE 1. The diaphragm is so proportioned that when in its relaxed state its bottom wall 19 is spaced upwardly from the bottom wall 3 of the tank, and its cylindrical wall 21 is spaced inwardly from the cylindrical wall of the tank to provide an annular space around the sides and bottom of the diaphragm, as clearly illustrated in FIGURE 1.

Another important features of the invention resides in the unique means provided for securing the upper marginal edge portion of the diaphragm to the tank wall, and whereby the connection between the diaphragm and tank wall will be leaktight. As best illustrated in FIGURE 4, the annular joint between the upper and lower tank sections 11 and 12 is so constructed as to provide an annular inwardly-facing groove 22. In the form shown in FIGURE 4, a separate flexible retaining ring 23 is shown having an outwardly-extending annular flange element 24 and an inwardly-facing groove or recess 25 provided with a restricted entrance 26. The annular recess in the retaining ring is adapted to receive a small annular bead 27 provided at the upper marginal edge of the cylindrical wall 21 of the diaphragm.

To secure the diaphragm in position within the tank, the annular bead 27 at the upper marginal edge thereof is fitted into the recess 25 in the retaining ring by distorting the ring to open the restricted annular passage 26. When the retaining ring has been thus attached to the diaphragm, the retaining ring is fitted against the cylindrical wall of the tank with its outwardly-extending flange element 24 fitting into the inwardly-facing groove 22 in the tank wall, as shown in FIGURE 1. The resiliency of the material from which the retaining ring 23 is constructed is sufficient to hold the retaining ring expanded against the cylindrical wall of the tank until pressure is subsequently introduced in the tank chambers. The diaphragm and retaining ring are preferably constructed of neoprene, well known in the industrial field.

In the form shown in FIGURE 5, the upper marginal portion of the cylindrical wall 21 of the diaphragm is shown provided with an enlarged integral bead 20, provided with a peripheral flange 20A, similar to flange 24 shown in FIGURE 4.

The lower portion of tank section 12 is provided with a fitting 28 comprising an interiorally threaded cap 29 to which one end of suitable conduit 31, such as a garden hose, may readily be attached. The opposite end of the hose 31 is connected to a suitable source of water under pressure, not shown. An air release valve, indicated at 32 in FIGURE 1, is provided in the wall of the lower tank section 12 whereby water pressure within that portion of the tank may be released when the sprayer is no longer to be used.

A fitting 33 similar to fitting 28 is secured to the cover 6 to provide an outlet for the liquid to be sprayed. One end of flexible tube 34 is affixed to the fitting 33 and resilient protector 35 of conventional construction has one end secured to the fitting 33 and extends upwardly therefrom over the adjacent end of tube 34 to prevent the tube from kinking and becoming damaged adjacent to the tank when the sprayer is in use.

A conventional spray gun or nozzle, generally designated by the numeral 36, has a pistol grip shown attached to the free end of tube 34. The spray gun has an operating handle or trigger 38 adjacent to its pistol grip 37 which may readily and conveniently be grasped by an operator to manipulate the spray gun when the sprayer is in use. A suitable screen, generally indicated by the numeral 39, prevents foreign matter which may be introduced into the reservoir 15 from entering tube 34 and causing the nozzle of the spray gun to become clogged, as will be understood.

In the operation of the novel sprayer herein disclosed a suitable chemical or liquid to be sprayed is introduced into the reservoir 15 when the cover 6 is removed from the top wall 4 of the tank. Before the chemical is delivered into the reservoir 15, the diaphragm may be in its normal relaxed state, as indicated by the dotted lines 18, shown in FIGURE 1. As the chemical is delivered into the cup-shaped diaphragm at the bottom of the tank 2, the wall of the diaphragm expands outwardly into engagement with the walls of the tank section 12 as a result of the weight of the chemical or liquid to be sprayed. The cover 6 is then applied to the tank to seal the filler opening 5 after which water under pressure is delivered into the bottom of the tank from the hose 31. As the water under pressure enters the tank below the diaphragm, the wall of the diaphragm is distorted and moved upwardly against the liquid to be sprayed in reservoir 15, whereby the insecticide or liquid to be sprayed is placed under pressure which may be equal to the pressure of the water introduced into the lower portion of the tank. Air trapped within the reservoir may be released by manipulation of trigger 38 of the spray gun. After the entrapped air has thus been released from the reservoir 15 the liquid contained therein may be freely sprayed from the spray gun by manipulation of the trigger 38 as is well known.

The novel sprayer herein disclosed has been found extremely practical and efficient for home use to spray flowers and various other plants with chemicals to control the infestation of insects and also for spraying fungicides and liquid fertilizers for stimulating plant growth. It may also be used for spraying paint and analogous products.

The sprayer in the smaller sizes may readily be carried about by grasping the handle 9 with one hand and actuating the spray gun with the other. It is preferably furnished with a flexible tube 34 approximately 20 to 25 feet long whereby the sprayer tank 2 may be placed on the lawn, whereby the operator need only carry the spray gun to get to the plants, as will be understood. The hose 31 may be of any suitable length depending upon where and how the sprayer is to be used.

The atomization of the chemical to be sprayed may be conveniently controlled by varying the pressure of the water delivered into the pressure chamber 16 from the hose 31. If desired, a suitable pressure regulating valve, not shown in the drawings, may be provided in the water supply hose 31 for controlling the pressure of the chemical in the reservoir 15.

When a spraying operation has been completed, any chemical remaining in the reservoir 15 is removed therefrom through the filler opening 5 by removal of the cover 6. The diaphragm therein can readily be removed from the interior of the tank by simply disengaging the retaining ring 23 or the enlarged bead 20 from the annular groove in the tank wall after which the diaphragm may be collapsed to permit its removal through the filler opening 5, as will be understood, after which the entire interior of the tank is exposed for cleaning, as will be noted.

It is apparent that many modifications and variations of this invention as hereinbefore set forth may be made without departing from the spirit and scope thereof. The specific embodiments described are given by way of example only and the invention is limited only by the terms of the appended claims.

We claim:

1. In a sprayer of the class described, a tank having an annular inwardly facing groove in its cylindrical wall intermediately of its ends, a flexible diaphragm in said tank provided at its upper marginal edge with an annular bead of substantial cross-section, said annular bead having an annular outwardly extending V-shaped flange on its periphery receivable in the groove in the tank wall when the diaphragm is inserted into the tank and said bead is pressed firmly against the tank wall, said diaphragm dividing the interior of the tank into two chambers, the external diameter of said bead being so proportioned relative to the interior diameter of the tank that when the bead is pressed firmly into engagement with the tank wall, it is retained in such position by the inherent resiliency of the material from which the bead is made, thereby to prevent leakage between the two chambers.

2. In a sprayer of the class described, a cylindrical tank having an annular inwardly facing V-shaped groove in its cylindrical wall intermediately of its ends, a flexible diaphragm in said tank dividing its interior into upper and lower chambers, the upper chamber being adapted to contain a liquid to be sprayed and the lower chamber being adapted to receive a pressure fluid, an annular resilient retaining and sealing ring, an outwardly extending annular V-shaped flange on the periphery of said ring receivable in the V-shaped groove in the tank wall when said ring is pressed firmly against the tank wall, thereby to prevent leakage between the two chambers within the tank body, said annular retaining and sealing ring having an inwardly facing annular groove in its inner surface for receiving an annular bead on the upper marginal edge of the diaphragm thereby to provide a leakproof connection between said ring and the diaphragm, said sealing ring being of such size that when fitted firmly against the interior surface of the tank wall with its annular flange received in the tank wall groove, the resiliency of the material from which the ring is made will retain it in sealing engagement with the tank wall to prevent leakage between the reservoir and pressure chamber.

References Cited in the file of this patent

UNITED STATES PATENTS

| | | |
|---|---|---|
| 243,192 | Baylor | June 21, 1881 |
| 2,199,110 | Metz | Apr. 30, 1940 |
| 2,339,876 | Phillips | Jan. 25, 1944 |
| 2,419,750 | Wiberg | Apr. 29, 1947 |
| 2,924,359 | Beremand | Feb. 9, 1960 |

FOREIGN PATENTS

| | | |
|---|---|---|
| 412,374 | Great Britain | June 28, 1934 |
| 588,631 | Germany | Nov. 21, 1933 |